United States Patent
Dosluoglu et al.

(10) Patent No.: US 8,681,253 B2
(45) Date of Patent: *Mar. 25, 2014

(54) IMAGING SYSTEM FOR CREATING AN OUTPUT SIGNAL INCLUDING DATA DOUBLE-SAMPLED FROM AN IMAGE SENSOR

(75) Inventors: Taner Dosluoglu, New York, NY (US); Guang Yang, Annandale, NJ (US); Peter Bartkovjak, Glengardner, NJ (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/196,283

(22) Filed: Aug. 2, 2011

(65) Prior Publication Data

US 2011/0285885 A1 Nov. 24, 2011

Related U.S. Application Data

(63) Continuation of application No. 11/998,960, filed on Dec. 3, 2007, now Pat. No. 8,013,920.

(60) Provisional application No. 60/872,120, filed on Dec. 1, 2006.

(51) Int. Cl.
    *H04N 3/14* (2006.01)
(52) U.S. Cl.
    USPC .......................................... 348/308; 348/310
(58) Field of Classification Search
    USPC ................................................ 348/308–310
    See application file for complete search history.

(56) References Cited

U.S. PATENT DOCUMENTS

| | | | |
|---|---|---|---|
| 5,920,345 A | 7/1999 | Sauer | |
| 6,037,979 A | 3/2000 | Yonemoto | |
| 6,107,655 A | 8/2000 | Guidash | |
| 6,184,928 B1 | 2/2001 | Kannegundia et al. | |
| 6,570,615 B1 | 5/2003 | Decker et al. | |
| 6,903,768 B1 | 6/2005 | Ohsawa et al. | |
| 6,960,757 B2 * | 11/2005 | Merrill et al. | 250/226 |
| 6,961,088 B2 | 11/2005 | Kameshima et al. | |

(Continued)

OTHER PUBLICATIONS

Miyatake et al.; Transversal-readout Architecture for CMOS Active Pixel Image Sensors; IEEE Trans. On Electron Devices, vol. 50, No. 1; Jan. 2003; pp. 121-129.

(Continued)

*Primary Examiner* — Ngoc-Yen Vu
(74) *Attorney, Agent, or Firm* — Stolowitz Ford Cowger LLP

(57) ABSTRACT

An imaging system provides a serial video signal that is indicative of the intensity of the light. The imaging system has an array of pixel image sensors arranged in rows and columns. A control circuit is in communication with the rows of the array and the plurality of column switches. The control circuit generates reset control signals, transfer gating signals, pixel image sensor initiation signals for each selected row for controlling resetting, integration of photoelectrons generated from the light impinging upon the array of pixel image sensors, charge transfer of the photoelectrons from the photosensing devices to the charge storage device, and to activate the photoelectron sensing devices on each row to generate output signals from each of the pixel image sensors on a selected row. The control circuit generates the column selection signals for transfer of the output signals from selected rows to form a serial video output signal.

20 Claims, 10 Drawing Sheets

(56) References Cited

U.S. PATENT DOCUMENTS

| | | | |
|---|---|---|---|
| 7,087,883 B2 | 8/2006 | He et al. | |
| 7,332,703 B2 * | 2/2008 | Shah | 250/214 R |
| 7,456,879 B2 * | 11/2008 | Lim et al. | 348/243 |
| 7,567,280 B2 * | 7/2009 | Muramatsu et al. | 348/294 |
| 7,642,497 B2 * | 1/2010 | Rhodes | 250/208.1 |
| 7,911,512 B2 * | 3/2011 | Henderson | 348/234 |
| 8,013,920 B2 | 9/2011 | Dosluoglu | |
| 2001/0033337 A1 | 10/2001 | Sakuragi | |
| 2002/0001037 A1 | 1/2002 | Miyawaki et al. | |
| 2002/0044211 A1 | 4/2002 | Tujii et al. | |
| 2003/0231252 A1 * | 12/2003 | Findlater et al. | 348/297 |
| 2004/0080650 A1 | 4/2004 | Hwang et al. | |
| 2005/0012836 A1 | 1/2005 | Guidash | |
| 2005/0168606 A1 | 8/2005 | Yonemoto | |
| 2005/0280730 A1 | 12/2005 | Lim et al. | |
| 2006/0017714 A1 | 1/2006 | Yonemoto | |
| 2006/0157643 A1 * | 7/2006 | Bamji et al. | 250/208.1 |
| 2006/0203110 A1 | 9/2006 | Lim et al. | |
| 2007/0132868 A1 | 6/2007 | Lee et al. | |
| 2008/0079830 A1 | 4/2008 | Lepage | |
| 2011/0050874 A1 * | 3/2011 | Reshef et al. | 348/65 |

OTHER PUBLICATIONS

Weimer et al.; Self-Scanned Image Sensors Based on Charge Transfer by the Bucker-Brigade Method; IEEE Trans. On Electron Devices, vol. 18, No. 11; Nov. 1971; pp. 996-1003.

\* cited by examiner

FIG. 1 – Prior Art

IMAGING SYSTEM FOR CREATING AN OUTPUT SIGNAL INCLUDING DATA DOUBLE-SAMPLED FROM AN IMAGE SENSOR

This application is a continuation of and claims priority to U.S. patent application Ser. No. 11/998,960, filed Dec. 3, 2007, now issued as U.S. Pat. No. 8,013,920, which claims priority under 35 U.S.C. §119 to U.S. Provisional Patent Application Ser. No. 60/872,120, filed Dec. 1, 2006, all of which are herein incorporated by reference in their entirety.

BACKGROUND OF THE INVENTION

1. Field of the Invention

The present invention relates to solid-state image sensing devices, methods and circuits for operating solid state image sensing devices and an imaging system using the same.

2. Description of Related Art

Integrated circuit image sensors are finding applications in a wide variety of fields, including medical imaging, machine vision, robotics, guidance and navigation, automotive applications, and consumer products such as digital camera and video recorders. Imaging circuits typically include a two dimensional array of photo sensors. Each photo sensor includes one picture element (pixel) of the image. Light energy emitted or reflected from an object impinges upon the array of photo sensors. The light energy is converted by the photo sensors to an electrical signal. Imaging circuitry scans the individual photo sensors to readout the electrical signals. The electrical signals of the image are processed by external circuitry for subsequent display.

Modern metal oxide semiconductor (MOS) design and processing techniques have been developed that provide for the capture of light as charge and the transporting of that charge within active pixel sensors and other structures so as to be accomplished with almost perfect efficiency and accuracy.

One class of solid-state image sensors includes an array of active pixel sensors (APS). An APS is a light sensing device with sensing circuitry inside each pixel. Each active pixel sensor includes a sensing element formed in a semiconductor substrate and capable of converting photons of light into electronic signals. As the photons of light strike the surface of a photoactive region of the solid-state image sensor, free charge carriers are generated and collected. Once collected the charge carriers, often referred to as charge packets or photoelectrons are transferred to output circuitry for processing.

An active pixel sensor also includes one or more active transistors within the pixel itself. The active transistors amplify and buffer the signals generated by the light sensing element to convert the photoelectron to an electronic signal prior to transferring the signal to a common conductor that conducts the signals to an output node.

Active pixel sensor devices are fabricated using processes that are consistent with complementary metal oxide semiconductor (CMOS) processes. Using standard CMOS processes allows many signal processing functions and operation controls to be integrated with an array of active pixel sensors on a single integrated circuit chip.

Refer now to FIG. 1 for a more detailed discussion of an active pixel image sensor array 5 of the prior art. The photodiode 15 are formed within the surface a substrate. A floating diffusion 25 is formed within the substrate to function as capacitive storage nodes for hold charge accumulated within the photodiode's 15 depletion region. The transfer gate switches 20 are connected between the photodiode 15 and the floating diffusion 25 and is activated by the transfer gate signal 30 connected to the gate of the transfer gate switch 20. The source of the reset transistor 35 is connected to the floating diffusion 25 and the drain of the reset transistor 35 is connected to the power supply voltage source VDD. The reset signal 50 is connected to the reset transistor 35 to activate the reset transistor 35 to connect the floating diffusion 25 to the power supply voltage source VDD to reset the floating diffusion to the voltage level of the power supply voltage source VDD. During the activation of the reset transistor 35, the transfer gate switch 20 is activated to also reset the voltage level of the photodiode 15 to the voltage level of the power supply voltage source VDD and remove any residual photoelectrons from the depletion region of the photodiode 15.

The floating diffusion 25 is connected to the gate of the source follower transistor 40. The drain of the source follower transistor 40 is connected to the power supply voltage source VDD and the emitter of the source follower transistor 40 is connected to the drain of the row select switch transistor 45. The gate of the row select switch transistor 45 is connected to the row select signal 55. The source follower transistor 40 acts to buffer the electrical signal created by the photoelectron charge collected in the floating diffusion 25.

The photons 17 that impinge upon the photodiode 15 are converted to photoelectrons and collected within the photodiode 15. At the completion of an integration of the collection of the photoelectrons, the transfer gate signal 30 is activated to turn on the transfer gate switch 20 to transfer the collected photoelectrons to the storage node of the floating diffusion 25. When the collected photoelectrons are retained at the floating diffusion 25 the row select signal 55 is activated to turn on the row select switch transistor 45 to gate the pixel conversion output electrical signal PIX_OUT to row bus 60. The amplitude of pixel conversion output electrical signal PIX_OUT is indicative of the intensity of the light energy hv or the number of photons 17 absorbed by the photodiode 15. Once the pixel output electrical signal PIX_OUT is read out the reset signal 50 is activated to turn on the reset transistor 35 and the photodiode 15 and the floating diffusion 25 are emptied of the photoelectrons.

The pixel image sensors $10a, \ldots, 10b, \ldots, 10m, \ldots, 10n$ are placed in columns and rows to form the array 5. Each of the pixel image sensors $10a, \ldots, 10b, \ldots, 10m, \ldots, 10n$ are structured as described above. The gate of the row select switch transistor $45a, \ldots, 45b, \ldots, 45m, \ldots, 45n$ of each pixel image sensor $10a, \ldots, 10b, \ldots, 10m, \ldots, 10n$ on each row of the array 5 is connected to the row select signal $55a, \ldots, 55n$ generated by the row control circuit 65. The source of each row select switch transistor $45a, \ldots, 45b, \ldots, 45m, \ldots, 45n$ of each pixel image sensor $10a, \ldots, 10b, \ldots, 10m, \ldots, 10n$ on each column of the array 5 is connected to a column sample and hold circuit $75a, \ldots, 75n$ through the row buses $60a, \ldots, 60n$.

The drain of each of the reset transistors 35 of the each pixel image sensor $10a, \ldots, 10b, \ldots, 10m, \ldots, 10n$ of the array 5 is connected to a power supply voltage source VDD through a distribution network to each pixel image sensor $10a, \ldots, 10b, \ldots, 10m, \ldots, 10n$. The gate of the reset transistor 35 of each pixel image sensor $10a, \ldots, 10b, \ldots, 10m, \ldots, 10n$ on each row of the array 5 is connected to the reset signal $50a, \ldots, 50n$ generated by the row control circuit 65 for selectively resetting the floating diffusion 25 and the photodiode 15 of each pixel image sensor $10a, \ldots, 10b, \ldots, 10m, \ldots, 10n$. The gate of each transfer gate switch 20 of each pixel image sensor $10a, \ldots, 10b, \ldots, 10m, \ldots, 10n$ on each row of the array 5 is connected to the transfer gate signal $30a, \ldots, 30n$ generated by the row control circuit 65 for transferring the photoelectrons from photodiode 15 to the floating diffusion 25 of each pixel image sensor 10a, ..., 10b, ..., 10m, ..., 10n.

The floating diffusion 25 acts as the photoelectron storage node for each pixel image sensor 10a, ..., 10b, ..., 10m, ..., 10n and is connected to the gate of the source follower source follower transistor 40. The drain of the source follower transistor 40 is connected to the power supply voltage source VDD and the source is connected to the drain of the row select switch transistor 45. The gate of the row select switch transistor 45 is connected to the row select signal 55 and the source is connected to the row bus 60a, ..., 60n for connection to the column sample and hold/image readout circuit 70.

The row select signal 55 activates the row select switch transistor 45 to transfer the voltage at the source of the source follower transistor 40 to the row bus 60a, ..., 60n for connection to the column sample and hold/image readout circuit 70. The voltage at the source of the source follower transistor 40 is proportional to the number of photons 17 that impinge upon each photodiode 15 of each pixel image sensor 10a, ..., 10b, ..., 10m, ..., 10n.

The column sample and hold circuit 75a, ..., 75n combines the column pixel row operation (pixel reset, row select) and the column operation (the photo generation, photo sensing). The sample and hold signal SH 84 and the clamp signal 83 are activated and deactivated by the column sample and hold/image readout circuit to respectively activate the switches SW1 77 and SW2 80 to capture the pixel output electrical signal PIX_OUT indicative of the level of the intensity of the light energy 17 present on each of the photodiode 15 of each pixel image sensor 10a, ..., 10b, ..., 10m, ..., 10n. This combination causes the output voltage of the column sample and hold circuit 75a, ..., 75n to be equal to the differential voltage of pixel reset level and photo conversion electrical signal level, i.e., $V_{out}=V_{rst}-V_{sig}$. During the pixel readout, switch $SW_3$ 81 controlled by column select signal COL_SEL 82 transfers the differential voltage through the column bus COL_BUS 85 to the video amplifier 92 of the image readout circuit 90 that applies the gain factor and offset correction factor to the output signal. The output of video amplifier 92 is the analog output that is digitized by an analog-to-digital converter 94. The output of the analog-to-digital converter 94 is the digital data word 95 that is transferred to an image processor.

"Self-Scanned Image Sensors Based on Charge Transfer by the Bucket-Brigade Method", Weimer, et al., IEEE Transactions on Electron Devices, November 1971, Vol.: 18, Issue: 11, pp.: 996-1003 describes solid-state image sensors which are internally scanned by charge transfer offer an alternative to sensors based on x-y addressing. Shift registers are employed for the x-y addressing.

"Transversal-Readout Architecture for CMOS Active Pixel Image Sensors", Miyatake, et al., IEEE Transactions on Electron Devices, Vol. 50, no. 1, pp: 121-129, January 2003 provides a novel architecture for CMOS active pixel image sensors (APS's), which eliminates the vertically striped fixed pattern noise (FPN). An array of transversal-readout APS is shown with two vertical (row) shift registers for addressing the rows of the array and a horizontal shift register for addressing the columns of the array. One of the with two vertical (row) shift registers is for selecting a row for reset and the other is of the with two vertical (row) shift registers is for selecting the row for readout.

U.S. Pat. No. 6,037,979 (Yonemoto) teaches a solid-state imaging device with a vertical shift register for addressing the row of the imaging device and a horizontal shift register that selects gating switches to transfer the conversion signal from each pixel of a selected row to a single amplifier.

U.S. Pat. No. 6,184,928 (Kannegundla, et al.) provides split shift register addressing for array applications such as imaging arrays. A fast shift register is coupled to a slow shift register by a combinatorial circuit having inputs from the fast shift register and the slow shift register to providing the selected address.

U.S. Pat. No. 6,570,615 (Decker, et al.) teaches a pixel readout scheme for image sensors that has a single differential to single-ended amplifier. The signals from each pixel are correlated double sampled passed through the select switches to the single differential to single-ended amplifier to an analog multiplexer, and thence to a programmed gain amplifier to an analog-to-digital converter.

U.S. Pat. No. 6,903,768 (Ohsawa, et al.) describes a solid state image sensor device with unit cells of the image sensing cell array having horizontal rows and vertical columns that are read by turning on an address register by means of the vertical shift register. Those of the vertical signal lines in the optical black pixel region are connected with each other through a wiring. Since the vertical signal lines in the optical black pixel region are connected with each other by a wiring, even if outputs from an optical black pixel region vary in the pixels, the outputs are made averaged and uniform and a variation in fixed pattern noises between the horizontal lines are reduced.

U.S. Pat. No. 6,961,088 (Kameshima, et al.) teaches a sensor array having a sample and hold circuit connected to an analog multiplexer. The signal from a selected column of sensors is applied through the multiplexer to an analog-to-digital converter. A shift register provides a selection of the column for each of the sensors on a selected row.

U.S. patent application 2001/0033337 (Sakuragi) provides an image pickup apparatus that includes a two-dimensional image pickup area, a vertical line selector for selecting a reading row in the image pickup area, vertical signal lines arranged in columnar direction, for reading a detection signal emitted by a photodiode located in a selected row, and a horizontal selection transistor for continuously reading detection signals carried by the vertical signal lines and writing the signals to a horizontal signal line arranged like a row in a matrix. The horizontal signals are generated by a vertical shift register for selecting the row of the matrix. The signals from each photodiode are applied to a vertical signal line that are applied to a single amplifier. Each column has a sample and hold circuit and a select switch to apply the signals from the sample and hold circuit to the amplifier. A horizontal shift register select which of the switches and thus the columns that are to be selected.

U.S. patent application 2002/0001037 (Miyawaki, et al.) describes a photoelectric conversion device that has sensors arranged in columns and rows. The columns and rows are addressed by a horizontal and vertical shift register. The sense signals are selectively applied to a single amplifier to create an output signal.

U.S. patent application 2002/0044211 (Tujii, et al.) teaches an image sensing device with a vertical shift register for the addressing of rows of the array of the image sensing device. An analog multiplexer receives signals from the columns of the image sensing device and applies them to an analog-to-digital converter.

U.S. patent application 2005/0012836 (Guidash) provides an image sensor that includes pixel output analog multiplexers that enables sample and hold of the signals from either of the two columns of pixels into either of the associated column circuits.

U.S. patent application 2005/0168606 (Yonemoto) illustrates a solid-state imaging device with a shift register used for a horizontal (row) scanning device and a charge holding device at the bottom of each row with switches to connect to a serial output amplifier.

U.S. patent application 2004/0080650 (Hwang, et al.) describes a CMOS image sensor single chip integrated with an RF transmitter.

SUMMARY OF THE INVENTION

An object of this invention is to provide an imaging system with circuits for controlling operation of an array of pixel image sensors that sense light impinging upon the pixel image sensors to provide a serial video signal that is indicative of the intensity of the light.

To accomplish at least this object, an imaging system for creating an image of an object has an image sensor and a control circuit fabricated on a surface of a substrate. The image sensor includes an array of pixel image sensors arranged in rows and columns upon the substrate for conversion of photons of the light impinging upon the image sensor to photoelectrons. Each of the pixel image sensors has an photoelectron sensing device such as a source follower transistor circuit having a high impedance input connected to detect presence of the photoelectrons on a charge storage device incorporated within the pixel image sensor, an output line containing an output voltage signal that has a magnitude related to a number of the photoelectrons, and a gated power supply source input to selectively receive a pixel image sensor initiation signal to activate the photoelectron sensing device to generate the output voltage signal. At the end of all the columns of the pixel images sensors are column switches. Each column switch is connected such that the output line of each photoelectron sensing device of each pixel image sensor is selectively connected to transfer each output signal from each pixel image sensor of a selected row.

The control circuit is in communication with the rows of the array of plurality of pixel image sensors and the plurality of column switches. The control circuit generates reset control signals, transfer gating signals, pixel image sensor initiation signals for each selected row for controlling resetting, integration of photoelectrons generated from the light impinging upon the array of pixel image sensors, charge transfer of the photoelectrons from the photosensing devices to the charge storage device, and to activate the photoelectron sensing devices on each row to generate output signals from each of the pixel image sensors on a selected row. The control circuit generates the column selection signals for transfer of the output signals from the selected row.

The control circuit generates the reset control signals, transfer gating signals, pixel image sensor initiation signals, and column selection signals to provide a double sampling of each pixel image sensor of each selected row. A first sampling of the double sampling is a reset level of each pixel image sensor on the selected row and a second sampling of the double sampling is a signal level related to the number of photoelectrons. The column selections signals activate each column selection switch to serially form each first sampling from each pixel image sensor into a reset output signal for transfer and serially form each second sampling from each pixel image sensor into a photon magnitude output signal for transfer serial video output signal. The control circuit further generates a vertical frame synchronization signal to indicate a beginning of transfer of a frame image prior to transfer of the serially formed first sampling and second sampling of a first selected row of said array of a plurality of pixel image sensors.

The array of the pixel image sensors has a row address shift register and column address shift register. The row address shift register is in communication with each row of the plurality of pixel image sensors to sequentially transfer the reset control signals, transfer gating signals, and pixel image sensor initiation signals to each pixel image sensor on the selected row. The column address shift register is in communication with each column of the plurality of pixel image sensors to sequentially transfer the column selection signal to each pixel image sensor to activate each column switch.

The imaging system additionally has a pixel reference voltage generator in communication with one of the column switches not connected to a column of the pixel image sensors for generating a pixel reference voltage. The pixel reference voltage is multiplexed with each of the first samplings and each of the second samplings of the pixel image sensors of a selected row to provide a serial output signal.

The column switches are connected to an amplifier to receive the serial output signal, condition, and amplify the serial output signal for transfer to an external processing circuit. The external processing circuit is in communication with the image sensor to demodulate, perform an analog-to-digital signal conversion, and determine a digital video signal from the first samplings and the second samplings indicative of the image of the light impinging upon the array of a plurality of pixel image sensors. The external processing circuit comprises a buffer memory circuit for retaining digital video signal from the first samplings, the second samplings, and the pixel reference voltage to await processing for determining the digital video signal. A video driver is in communication with the video amplifier to receive, buffer and modulate the serial output signal for transmission to the external processing circuit.

Each of the pixel image sensors includes a reset triggering switch in communication with the charge storage device to place the pixel image sensor to a reset voltage level after integration and sensing of the photoelectrons. The reset triggering switch is further in communication with the row control circuit to receive one of the reset control signals and the pixel image sensor initiation signal for activation of the reset triggering switch for resetting the pixel image sensors on a selected row.

DETAILED DESCRIPTION OF THE INVENTION

Image sensor applications such as medical endoscopy require minimum chip size while maintaining imager quality and good electromagnetic interference characteristics. The image sensor system of this invention provides an imager structure that requires only a clock input and a single analog sensor and system control circuit. The image sensor transmits a video signal to a receiving image processing system via a transmission media, such as a cable that is subject to interference, without loosing the signal integrity.

Figure 1:
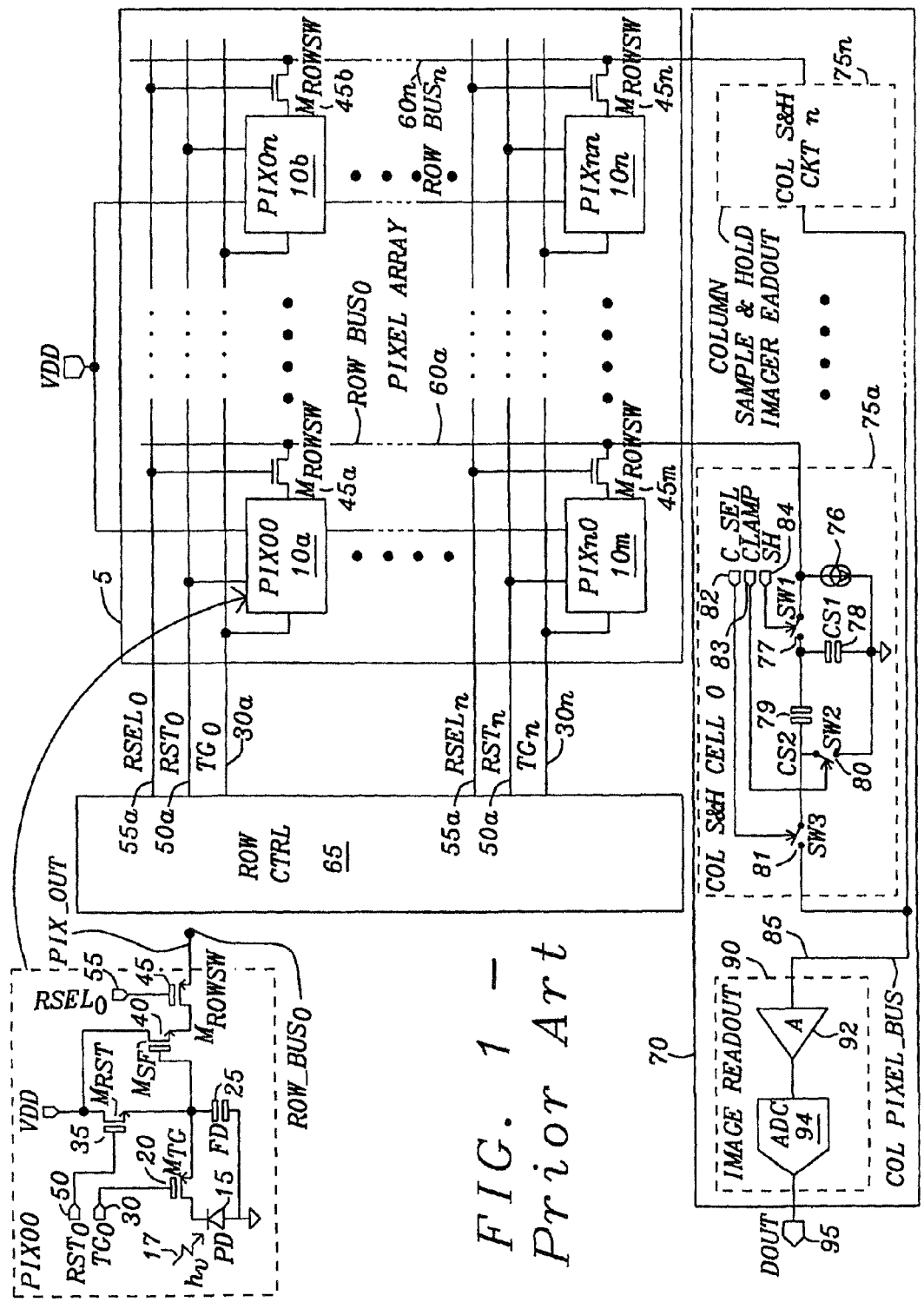
FIG. 1 is a functional diagram of an image sensor system of the prior art.
Figure 2:
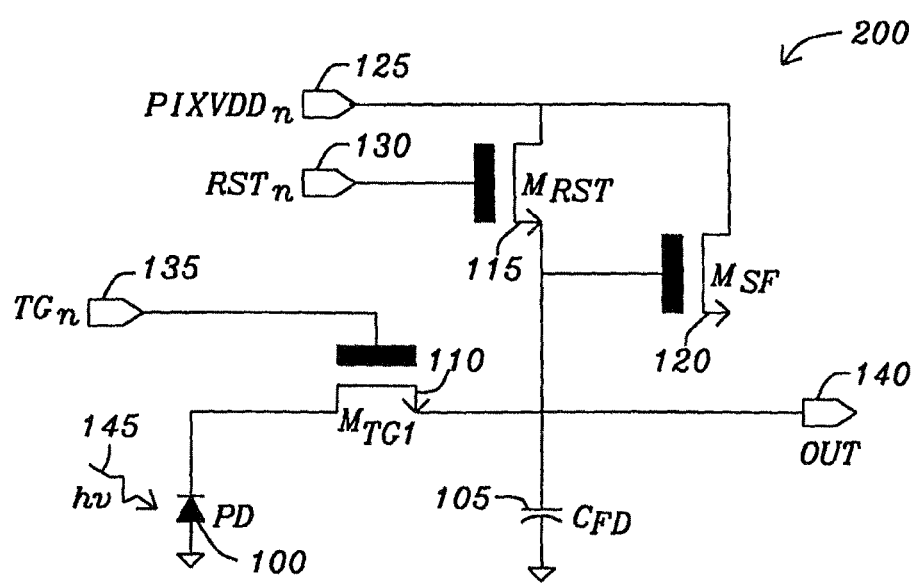
FIG. 2 is a schematic of a pixel image sensor incorporated in an image sensor system of this invention.

The pixel image sensor of the image sensor system of this invention has an active pixel sensor circuit similar to that described in U.S. Pat. No. 5,920,345 (Sauer). The pixel image sensor 200, as shown in FIG. 2, has a gated power supply voltage source distribution line 125 that is coupled to the drain terminals of the reset MOS transistor 115 and the source follower MOS transistor 120. The gated power supply voltage source distribution line 125 is connected through a row control circuit to selectively connect the drain terminals of the reset MOS transistor 115 and the source follower MOS transistor 120 to a power supply voltage source VDD. The source follower transistor 120 is connected to a column output line 140. When the gated power supply voltage source distribution line 125 is activated, the pixel image sensor is provided power for resetting the photodiode sensor 100 and the floating diffusion capacitance storage node 105. The gated power supply voltage source distribution line 125 further provides power for the source follower MOS transistor 120 to generate an output voltage on the output line 140 having a magnitude related to the magnitude of the photoelectrons present on the floating diffusion capacitance storage node 105.

In operation, photons, 145 impinge upon the photodiode 100 and are converted to photoelectrons. The gate of the reset MOS transistor 115 is connected to the reset signal line 130, which, when activated turns on the reset MOS transistor 115 to connect the floating diffusion capacitance storage node 105 to the gated power supply voltage source distribution line 125 to reset the floating diffusion capacitance storage node 105. Simultaneously, the transfer gate signal line 135 is activated to reset or remove photoelectrons from the depletion region of the photodiode. After the reset signal line 130 is deactivated, the photodiode is exposed to the photons for conversion and integration of photoelectrons. At the end of the integration period, the transfer gate signal line 135 that is connected to the gate of the transfer gate 110 is activated. The transfer gate 110 has its drain connected to the photodiode 100 and its source to the floating diffusion capacitance storage node 105. When activated the transfer gate 110 is turned on to allow the photoelectrons that are resident in the depletion layer of the photodiode 100 to migrate to the floating diffusion capacitance storage node 105. The voltage level created by the photoelectrons is sensed by the source follower MOS transistor 120 to create the output conversion signal 140 that is transferred to a column bus line of an array.

Figure 3:
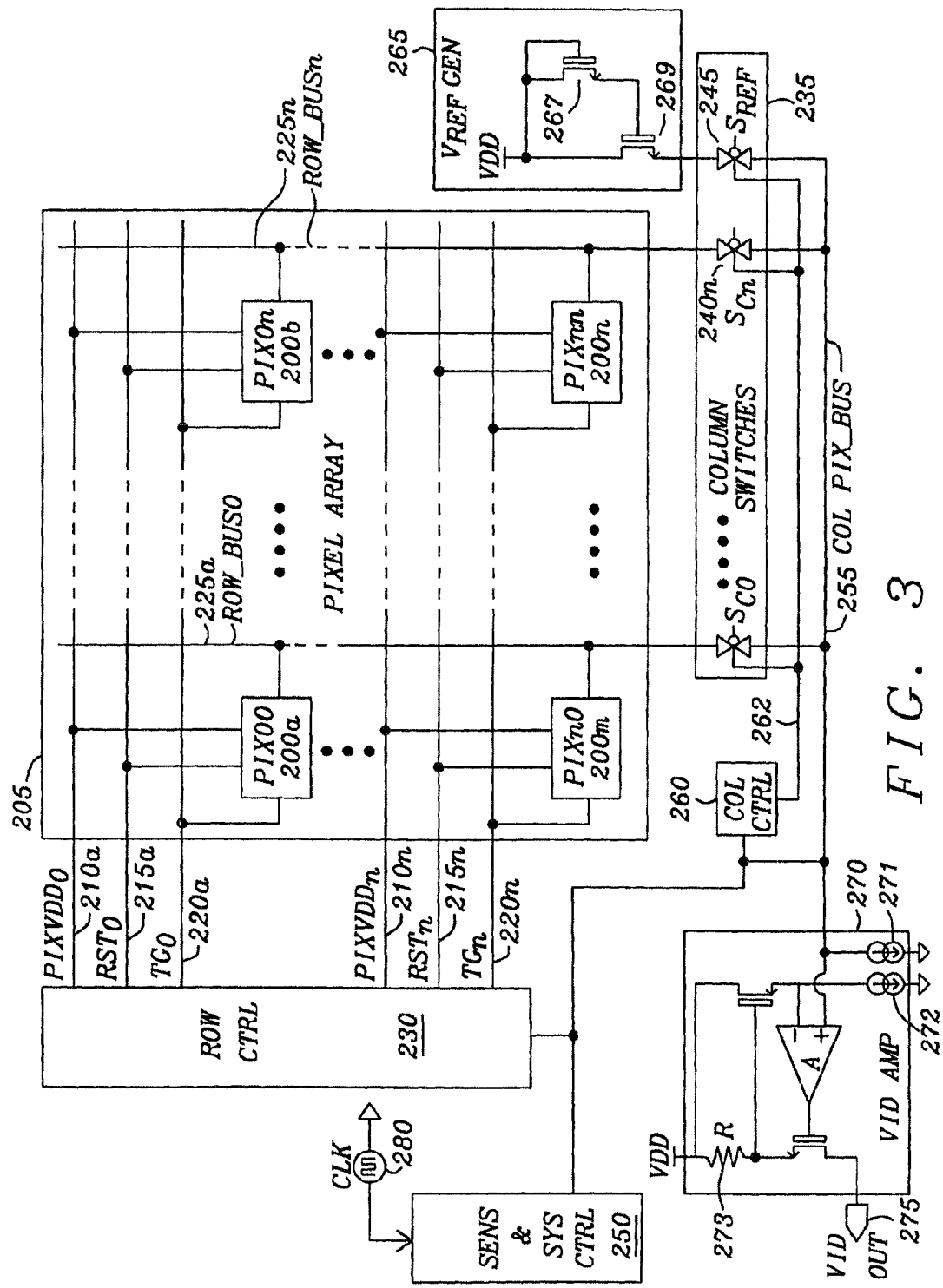
FIG. 3 is a functional diagram of an image sensor system of this invention.

Multiple pixel image sensors 200 of FIG. 2 are shown in FIG. 3 arranged in rows and columns to form an array 205. A gated power supply voltage source row distribution lines 210a, . . . , 210n are each connected commonly to each pixel image sensor 200a, . . . , 200b, . . . , 200m, . . . , 200n of each one of the rows of the pixel image sensors 200a, . . . , 200b, . . . , 200m, . . . , 200n. When the gated power supply voltage source row distribution line 210a, . . . , 210n is activated the power supply voltage source is connected as described above to the drain terminals of the reset MOS transistor and the source follower MOS transistor of each of the pixel image sensors 200a, . . . , 200b, . . . , 200m, . . . , 200n.

The row reset gating signal lines 215a, . . . , 215n are each connected to each reset signal line of each of the pixel image sensors 200a, . . . , 200b, . . . , 200m, . . . , 200n on each row of the array 205. When the gated power supply voltage source row distribution line 210a, . . . , 210n and the row reset gating signal line 215a, . . . , 215n are activated, the photodiodes and the floating diffusion capacitance storage node of the pixel image sensors 200a, . . . , 200b, . . . , 200m, . . . , 200n of the selected row of the array 205 are set to the reset voltage level.

The row transfer gating signal lines 220a, . . . , 220n are each connected to each transfer gate signal line of each of the pixel image sensors 200a, . . . , 200b, . . . , 200m, . . . , 200n. After the floating diffusion capacitance storage node of the pixel image sensors 200a, . . . , 200b, . . . , 200m, . . . , 200n of the selected row of the array 205 are reset and the photons of the impinging light are converted to photoelectrons, the row transfer gating signal line 220a, . . . , 220n of a selected row is activated to transfer the photoelectrons to the floating diffusion capacitance storage node of each of the pixel image sensor 200a, . . . , 200b, . . . , 200m, . . . , 200n of the selected row. Since the gated power supply voltage source row distribution line 210a, . . . , 210n of the selected row is activated, the source follower of the pixel image sensors 200a, . . . , 200b, . . . , 200m, . . . , 200n of the selected row transfers the pixel output signal to each of the column signal buses 225a, . . . , 225n for connected to the column switches 235.

The row control circuit 230 is a shift register based circuit that receives appropriate timing, reset, and control signals from the sensor and system control circuit 250 to generate the timing for the gated power supply voltage source row distribution lines 210a, . . . , 210n, the row reset gating signal lines 215a, . . . , 215n, and the row transfer gating signal lines 220a, . . . , 220n to control operation of the array 205 of pixel image sensors 200a, . . . , 200b, . . . , 200m, . . . , 200n. Refer now to FIG. 6 for a description of these signal timings for activation of two rows of the array 205. At the beginning of each successive activation (τ0), the gated power supply voltage source row distribution line 210n−1 and 210n for each row to be activated is initiated and the row transfer gating signal lines 220n−1 and 220n are activated to turn on the transfer gates of each pixel image sensor 200a, . . . , 200b, . . . , 200m, . . . , 200n of first the selected row (n−1) for the first activation period and the second selected row (N) for the successive activation period. At the time τ1, the row transfer gating signal lines 220n−1 and 220n are deactivated and at the time τ2, the row reset gating signal lines 215n−1 and 215n are deactivated. During the time period from the time .tau.2 to the time .tau.3, the selected row of pixel image sensors 200a, . . . , 200b, . . . , 200m, . . . , 200n are converting and integrating the photons impinging upon the array to photoelectrons. Further during the time period from the time τ2 to the time τ3, the source follower of the pixel image sensors 200a, . . . , 200b, . . . , 200m, . . . , 200n of the selected row n−1 and n transfers the pixel output signal for the reset voltage level to each of the column signal buses 225a, . . . , 225n. Between the times τ3 and τ4, the row transfer gating signal lines 220n−1 and 220n are activated to transfer the photoelectrons integrated during the period from .tau.2 to .tau.3 to the floating diffusion capacitance storage node of the pixel image sensors 200a, . . . , 200b, . . . , 200m, . . . , 200n of the selected row (n−1 or n). At the deactivation of the row transfer gating signal lines 220n−1 and 220n at the time τ4, the source follower of the pixel image sensors 200a, . . . , 200b, . . . , 200m, . . . , 200n of the selected row n−1 and n transfers the pixel output signal for the pixel conversion signal voltage level to each of the column signal buses 225a, . . . , 225n until the time τ5. At the time τ5, the row reset gating signal line 215n−1 and 215n is activated with the row transfer gating signal lines 220n−1 and 220n to reset the pixel image sensor 200a, . . . , 200b, . . . , 200m, . . . , 200n of the selected row (n−1 or n). At the time τ6, the row transfer gating signal lines 220n−1 and 220n is deactivated and at the time beginning time of the next cycle τ0, the gated power supply voltage source row distribution line 210n−1 and 210n is deactivated. All the rows, except the activated row (n−1 or n), have their gated power supply voltage source row distribution lines 210a, . . . , 210n deactivated and their row reset gating signal line 215a, . . . , 215n signals activated to essentially place the photodiodes and the floating diffusion capacitance storage nodes of the pixel image sensors 200a, . . . , 200b, . . . , 200m, . . . , 200n of the non-selected rows of the array 205 at the ground reference voltage level.

The pixel output signals placed on each of the column signal buses 225a, . . . , 225n are the inputs to the column switches 235. Each column switch 240a, . . . , 240n sequentially connects the column signal buses 225a, . . . , 225n to the column pixel bus 255 to create the serial video output. Each row of the pixel image sensors 200a, . . . , 200b, . . . , 200m, . . . , 200n is doubly read, first to transfer the reset voltage level for the pixel image sensors 200a, . . . , 200b, . . . , 200m, . . . , 200n of the selected row and second to transfer the conversion voltage signal level for the pixel image sensors 200a, . . . , 200b, . . . , 200m, . . . , 200n of the selected row. The column control circuit 260 is essentially a shift register that sequentially provides the column switch activation signals to the column switches 240a, . . . , 240n. The sensor and system control circuit 250 provides the necessary timing and control signals to the column control circuit 260 to generate the column switch activation signals at the appropriate time to generate the serial video output signal on the column pixel bus 255.

The sensor and system control circuit 250 is further connected to the column pixel bus 255 to provide the vertical synchronizing signal, the horizontal signal, and an intra-column synchronizing signal at the appropriate times to indicate the beginning of the scan of an array, beginning of the readout of each row, and the separation of the read out of the reset levels of a row and the read out of the conversion signal levels.

The clock generator 280 provides the digital timing necessary for the sensor and system control circuit 250 to generate the control signals for the row control circuit 230 and the column control circuit 260 and to generate the vertical synchronizing signal, the horizontal signal, and an intra-column synchronizing signal. The clock generator 280 may integrated with the image sensor or generated externally and applied as an input signal to the image sensor.

The column pixel bus 255 is connected to the video amplifier 270. The video amplifier 270 receives the serial video output signal on the column pixel bus 255 to amplify and condition the serial video output signal for transfer to external video receiver circuit. The video amplifier 270 is a push pull current amplifier capable of driving the load of an external cable. An example of the external cable would be a 100 ohm cable with +/−5 mA maximum output current. The video amplifier 270 has an output 275 referenced to the power supply voltage source VDD for ground reference noise isolation. The current sources 271 and 272 at the input of the video amplifier have a very high ground reference noise rejection using a cascoded architecture. The output current of the video amplifier 270 is generated across the output resistor 273. For the resistor 273 with a value of 500 ohms, the output current will be approximately 2 mA and 4 ma for reset level and saturation level, respectively.

The pixel reference voltage generator 265 has a diode connected MOS transistor 267 connected to the source follower transistor 269. The source of the source follower transistor 269 is connected to the reference column switch 245 to connect the pixel reference voltage generator 265 to the column pixel bus 255 in the periods between the accessing each of the column signal buses 225a, . . . , 225n to provide the reference level for the reset level and the conversion signal level. The pixel reference voltage generator 265 is placed close to the video amplifier 270. The diode connected MOS transistor 267 connected to the source follower transistor 269 have dimensions chosen to guarantee lowest threshold voltage (Vt) drops compared to the minimum size pixel array transistors. The transmission gate reference column switch 245 is turned on when the clock is low while all the other column selects for the column signal buses 225a, . . . , 225n occur when clock is high.

Alternatively, a more complicated output circuit (not shown) which allows switching the output between plus/minus (+/−) output current level to provide a double rate (2.times.) pixel rate carrier signal. The double rate pixel rate carrier signal would act as an amplitude modulation (AM). Depending on the frequency of any interfering signals, the output modulation rates greater than the double pixel rate could be chose. Further, other modulation techniques such as frequency modulation (FM) of the output could be chosen for improved interference suppression and be in keeping with the intent of this invention.

Figure 4:
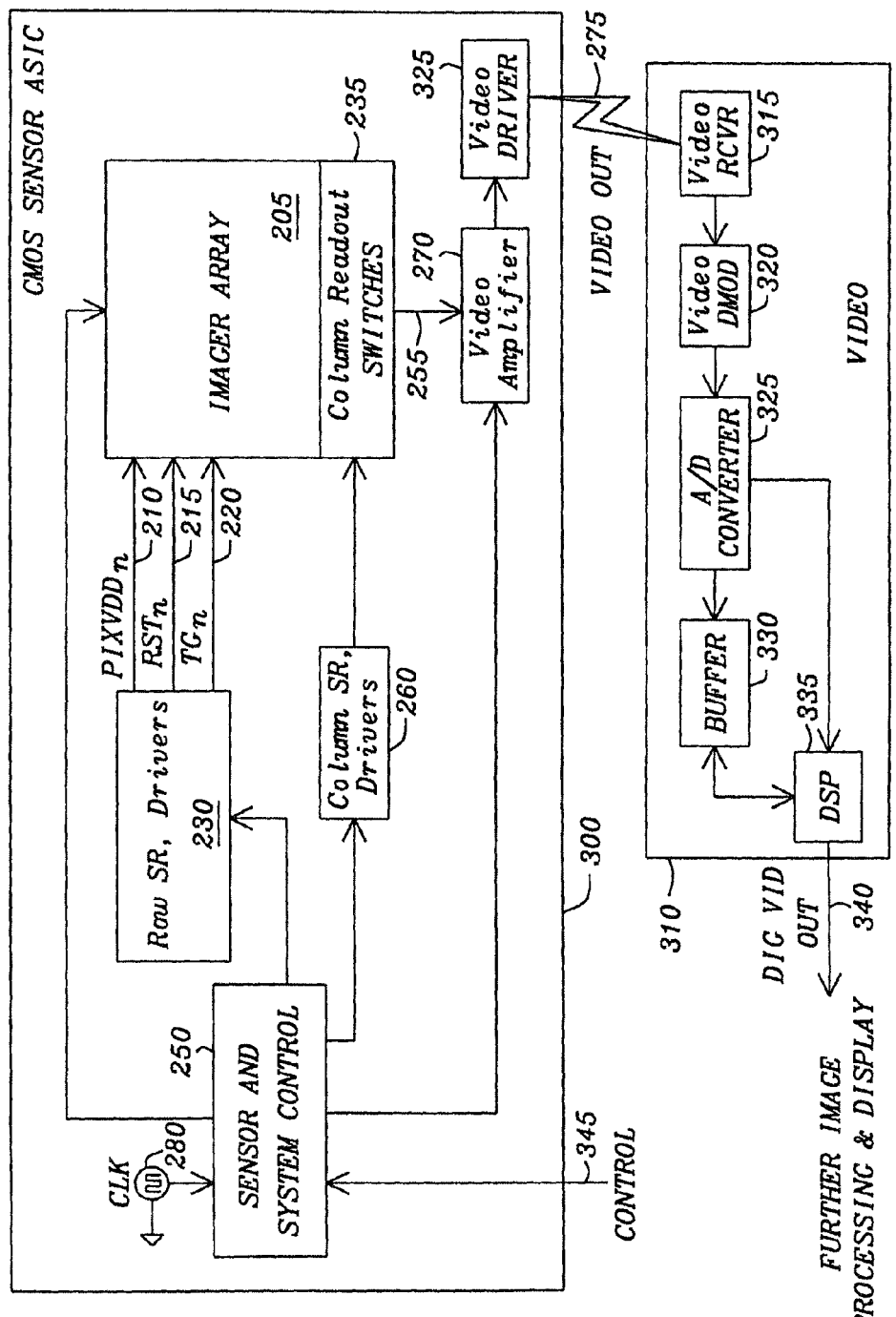
FIG. 4 is a block diagram of an image sensor system of this invention.
Figure 5:
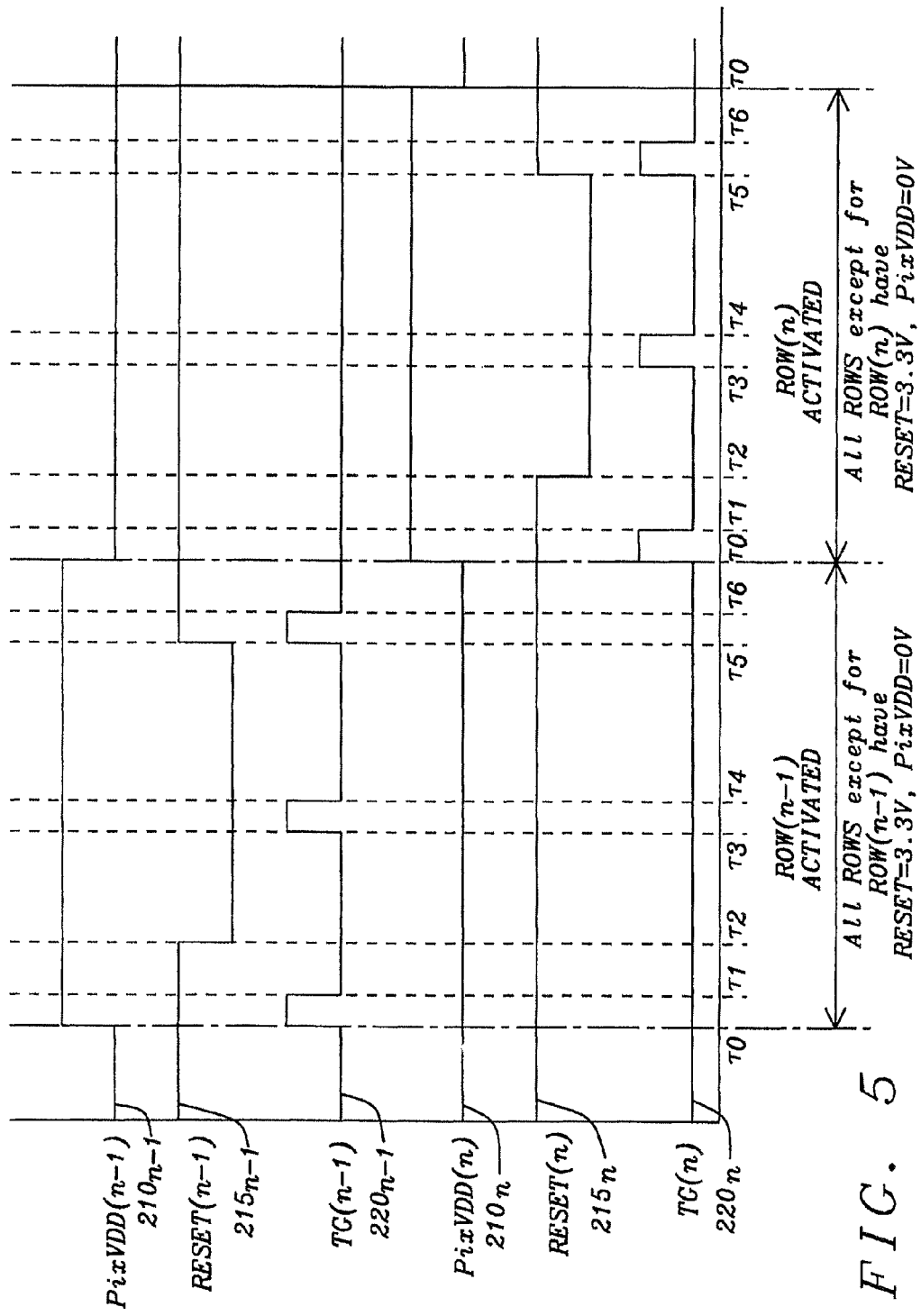
FIG. 5 is a timing diagram of the operation of the pixel image sensor incorporated in the image sensor system of this invention.

The imager structure of this invention as described in FIG. 3 is incorporated as a CMOS image sensor application specific integrated circuit (ASIC) 300 in an image sensor system of FIG. 4. Referring to FIG. 4, the CMOS image sensor ASIC 300 includes the imager array 205. The row shift register and drivers 230 provides the row control signals to the image array 205. The row pixel activation signal 210 selectively applies a gated power supply voltage source PIXVDD to each selected row of pixel images sensors of the image array 205. The row reset signal line 215 selectively gates the voltage level of the gated power supply voltage source PIXVDD to the photodiode and the floating diffusion capacitance storage node of each pixel to reset each pixel prior to integration and conversion of the photon to photoelectrons. The row transfer gate signal 220 activates each transfer gate during the readout operation to transfer the photoelectrons from the photodiode to the floating diffusion capacitance storage node.

The column shift register driver 260 provides the column switch controls to the column readout switches 235 to selectively and sequentially connect each of the column signal buses to the column pixel bus to provide the double sampling where the first sampling is the reset level of a selected row and the second sampling is the conversion signal level of the selected row. The serial video output signal of the column readout switches 235 are transferred on the column pixel bus 255 to the video amplifier 270.

The sensor and system control circuit 250 is connected to the row shift register and drivers 230 and the column shift register driver 260 to provide the control and the timing for the row pixel activation signal 210, row reset signal line 215, and row transfer gate signal 220. Further, the sensor and system control circuit 250 is connected to the video amplifier 270 to provide the vertical synchronization signal, the horizontal synchronization signal, and the intra-column synchronization signal to synchronize the sampling signals of the serialized output signals.

As noted above, the clock generator 280 provides the clocking signal for the sensor and system control circuit 250 for generating the appropriate timing and control signals. The clock generator 280 maybe an external circuit that generates a control signal 340 that is applied externally to the CMOS image sensor ASIC 300.

The video amplifier 270 will amplify and condition the serial video signal 255 for transmission as the video output signal 275. The video driver 305 maybe included as a driver modulator to provide various output modulation rates and techniques for improved interference suppression. The video output transmission 275 maybe on a cable, for example within an endoscope, or as a radio frequency through the environment for a wireless communication of the image.

The transmitted serial video output signal 275 is captured by the video processing system 310. The video receiver receives the transmitted video signal 275 amplifies and conditions the video signal. If the video signal has been modulated according to one of the above described techniques, it is transferred to the video demodulator 320 for demodulation to recover the original serial video signal. The serial video signal is applied to an analog-to-digital converter 325 for conversion to digital video data. The digital video data to transferred to a buffer memory 330 for storage for further processing. Further, the synchronization signals are extracted to determine the timing for the digital video data. The digital signal processor 335 extracts the digitized reset voltage level, the digital conversion voltage level, and the reference voltage levels for each pixel on each row and determines the Pixel Level Value as:

Pixel Level Value=(Δ Photon Conversion Levels & Pixel Ref Levels)−(Δ Reset Levels & Pixel Ref Levels)

The pixel level values are formatted to generate a digital video output signal 340 that is transferred for further processing, storage, and display.

Figure 6A:
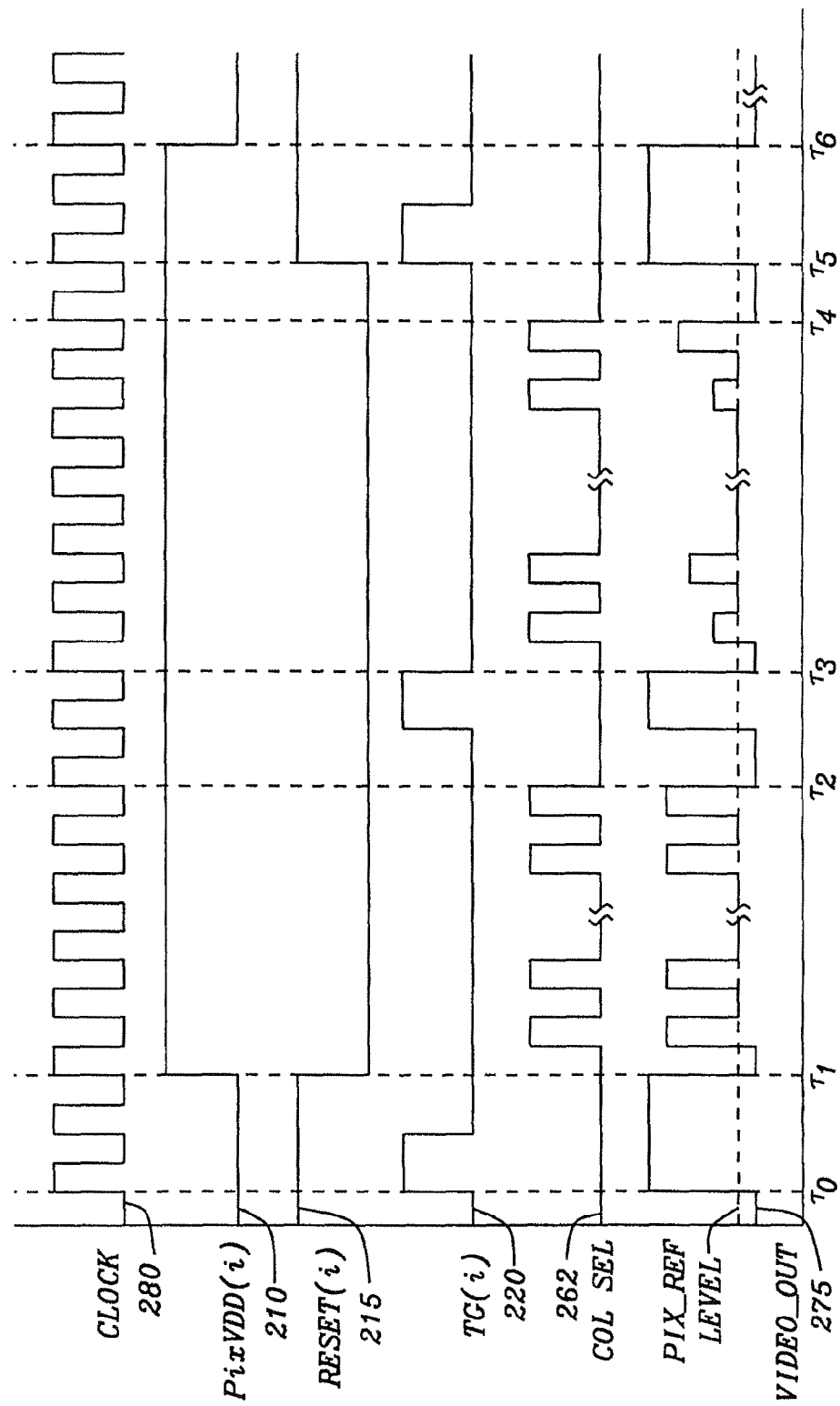
FIGS. 6a, 6b, and 6c are timing diagrams of the operation of the image sensor system of this invention.

Refer now to FIGS. 3 and 6a for a description of the timing of the operation of the image sensor of this invention. The clock generator 280 provides the clock timing signal for synchronizing the operation of the image sensor. At the beginning of the transfer of an image (prior to the time $t_0$) a vertical synchronization pulse is transferred by the sensor and system control circuit 250 to the column pixel bus 255 to denote the beginning of the transfer of a frame.

The sensor and system control circuit 250 initiates the row control circuit 230 to generate the row pixel activation signal 210, row reset signal line 215, and row transfer gate signal 220 and generates the horizontal synchronization pulse during the period of time between the time $t_o$ and the time $t_1$. At the time between the time $t_0$ of each of the row access times, the row control circuit 230 maintains the reset signal to reset the floating diffusion capacitance storage node of each pixel. The row control circuit 230 sets the gated power supply voltage source row distribution lines 210 to the ground reference voltage level and the row transfer gating signal lines 220 is activated to essentially set the photodiode to the ground reference voltage level. At the time $t_1$, the row control circuit 230 activates the gated power supply voltage source row distribution lines 210 and deactivates the row reset gating signal lines 215. The sensor and system control circuit 250 activates the column control circuit 260 to activate the column select line 262 to sequentially turn on each column select line 240. The period of each column select line 240 is approximately equal to that of the one half of the clock 280 cycle. During the remainder of the clock 280 cycle, the reference column switch 245 is activated to place the pixel reference voltage level at the serial video output line 275 between each of the reset voltage levels for each pixel of the selected row.

During the period of time between the time $t_1$ and the time $t_2$, the photodiodes of each pixel image sensors 200a, ..., 200b, ..., 200m, ..., 200n of the selected row is exposed to the photons to allow conversion and integration of the photoelectrons. During the period of time between the time $t_2$ and the time $t_3$, the intra-column synchronization signal generated by the sensor and system control circuit 250 to be placed on the video output 275. In the period of time between the time $t_2$ and the time $t_3$, the row transfer gating signal lines 220 is activated to activate the transfer gate of the pixel image sensors 200a, ..., 200b, ..., 200m, ..., 200n of the selected row to transfer the photoelectrons from the photodiodes to the floating diffusion capacitance storage node of the pixel image sensors 200a, ..., 200b, ..., 200m, ..., 200n of the selected row. The row transfer gating signal lines 220 is terminated at the time $t_3$.

Simultaneously, at the time $t_3$, the sensor and system control circuit 250 activates the column control circuit 260 to activate the column select lines 262 to sequentially turn on each column select line 240 to transfer the conversion signal levels to the video output 275. As described above, the period of each column select line 240 is approximately equal to that of the one half of the clock 280 cycle. During the remainder of the clock 280 cycle, the reference column switch 245 is activated to place the pixel reference voltage level at the serial video output line 275 between each of the conversion signal levels for each pixel of the selected row. The conversion signal levels are completed at the time $t_4$. At the time $t_5$, the row reset gating signal lines 215 and the row transfer gating signal line 220 are activated to reset the photodiodes and the floating diffusion capacitance storage node of each pixel image sensors 200a, ..., 200b, ..., 200m, ..., 200n of a selected row. At the time $t_6$, the gated power supply voltage source row distribution lines 210 are deactivated for the selected row and the next row is selected. The time period between the time $t_5$ and time $t_6$ is also the time of the horizontal synchronization pulse between the outputs of the selected rows.

Figure 6B:
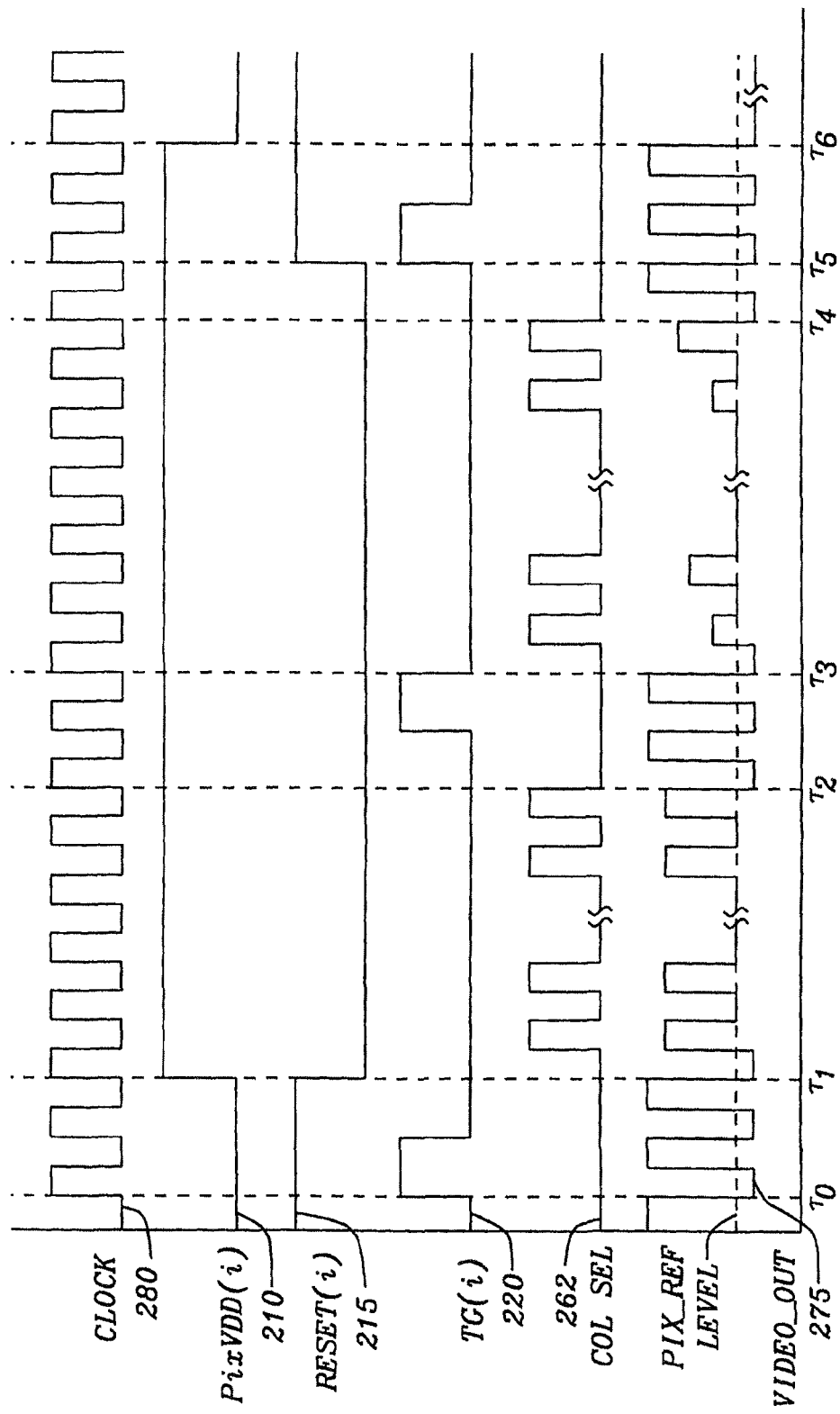

FIG. 6b illustrates an alternative to the video output signal 275. The clock signal 280, the gated power supply voltage source row distribution lines 210, the row reset gating signal lines 215, the row transfer gating signal lines 220, and the column select lines 262 are as shown in FIG. 6a. The horizontal synchronization pulse is modified to have multiple pulses having a repetition rate equal to that of the clock signal 280. The multiple pulse of the horizontal synchronization allows for a phase locking of the video output signal 275 in the video receiver.

Figure 6C:
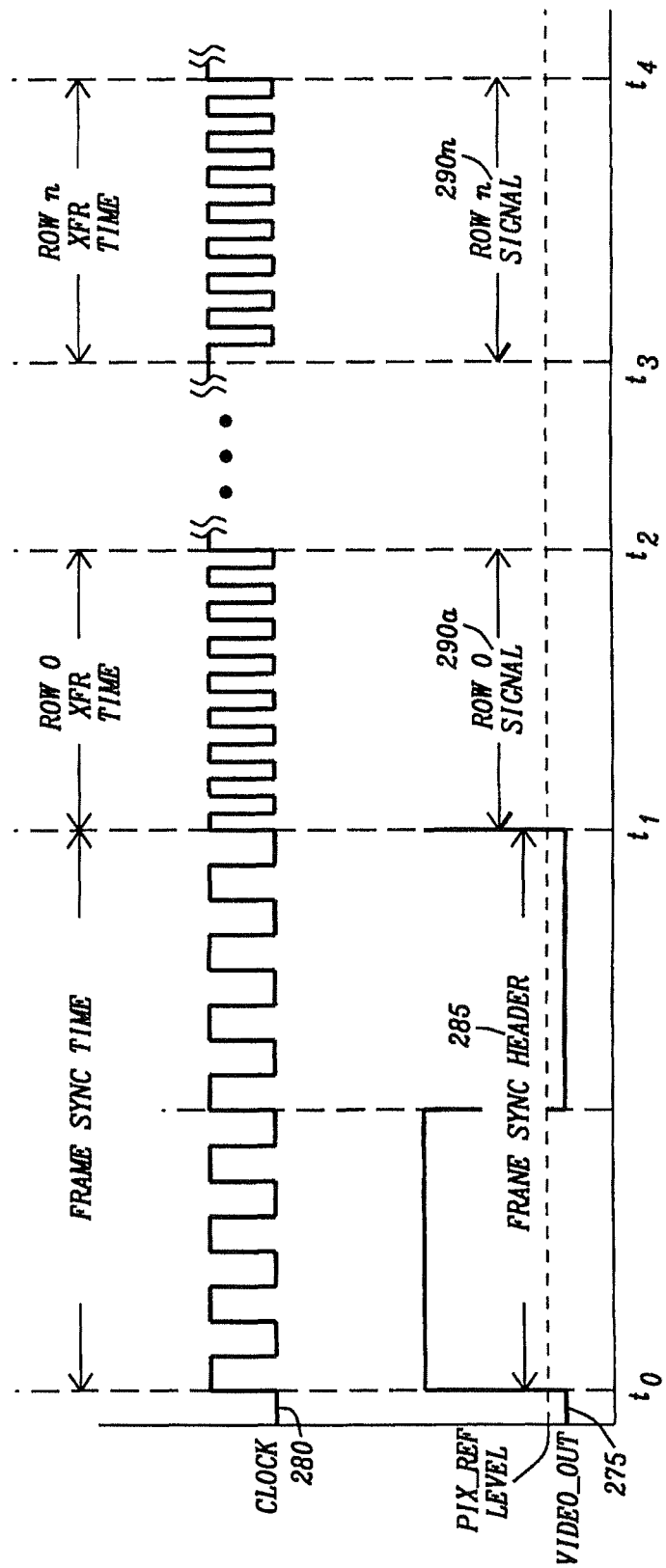

Refer now to FIGS. 3 and 6c for a discussion of the vertical frame synchronization signal 285 generated at the beginning of the transfer of an image at the video output signal 275. The sensor and system control circuit 250 has a counter that keeps track of the number of clock cycles 280. The sensor and system control circuit 250 sends out the vertical frame synchronization signal 285 during the time period from the $t_0$ time $t_1$ to the row control circuit 230 and column control circuit 260 after counting the appropriate number of clock signals. This starts reading out the first row of the image array 205 during the time period from the $t_1$ to time $t_2$. Each successive row is read out during the time period from the $t_2$ to time $t_3$, with the last row (row n) read out during the time period from the $t_3$ to time $t_4$. The sensor and system control circuit 250 then sends out another vertical frame synchronization signal 285 after the last row of the image array 205 is read out at the time $t_4$ to start the next frame. This is repeated for all succeeding frames.

Since the image sensor described in this invention has only one video output signal 275, it does not have a separate output line to provide a frame synchronization signal 285 and thus must share the serial video output 275. The frame synchronization signal 285 now functions as a synchronization header signal indicating the beginning of one frame of an image being transferred as the video output signal 275. The frame header synchronization signal 285 is shown in this example as a sequence of 4-clock cycle HIGH, followed by 4-clock cycle LOW. However, any appropriate coding for the frame synchronization signal 285 may be used and still be in keeping with the intent of this invention. At the completion of the frame synchronization head signal 285, the video signals 290a for the first row are transferred, followed by the video signals for each successive row of the array 205. After the video signals 290n for the last row of the array 205 are transferred, the synchronization header signal 285 for the next image frame is transferred indicating the beginning of the next frame of the image.

Figure 7:
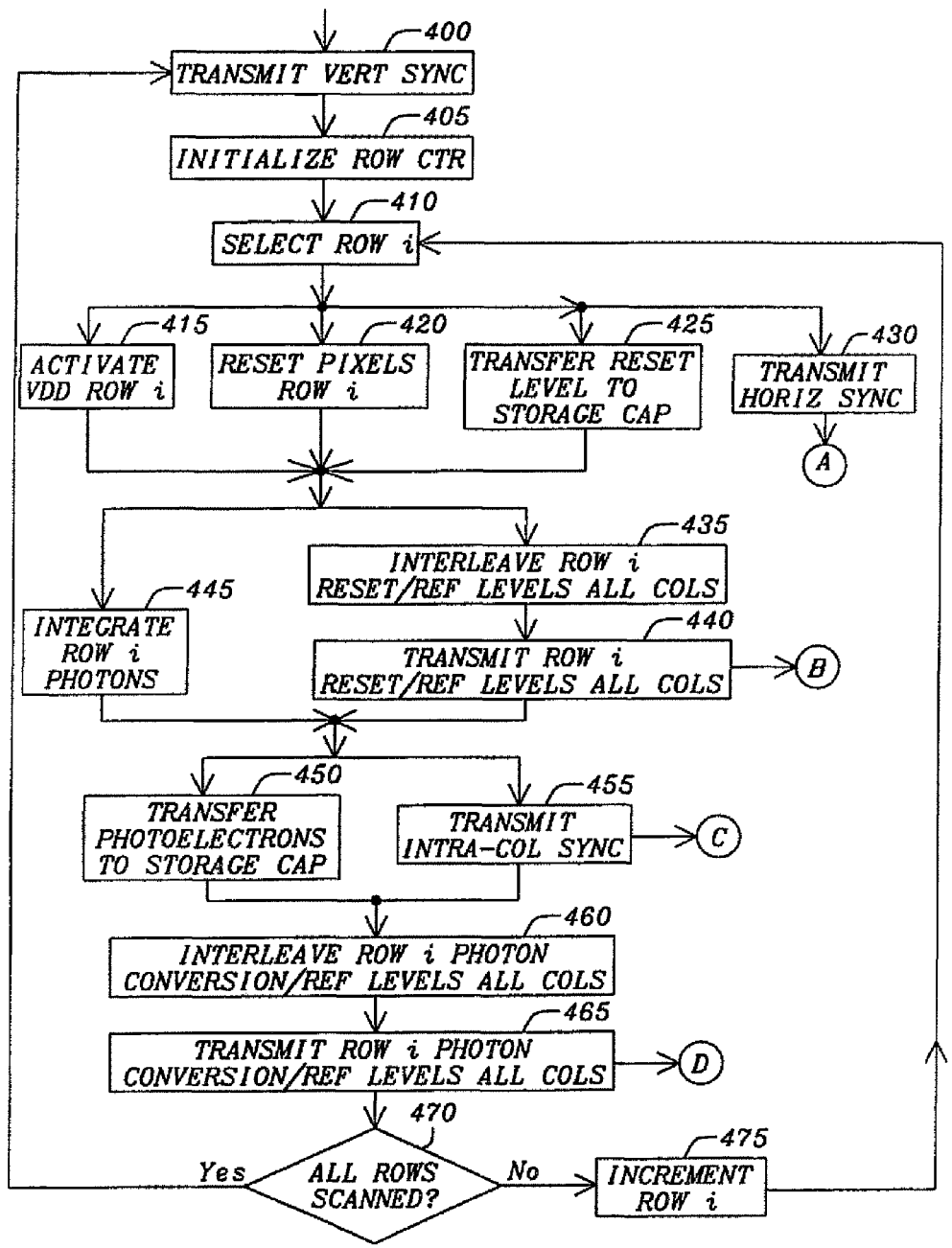
FIGS. 7 and 8 are flow charts for a method for capturing an image of an object by an image sensor of this invention.
Figure 8:
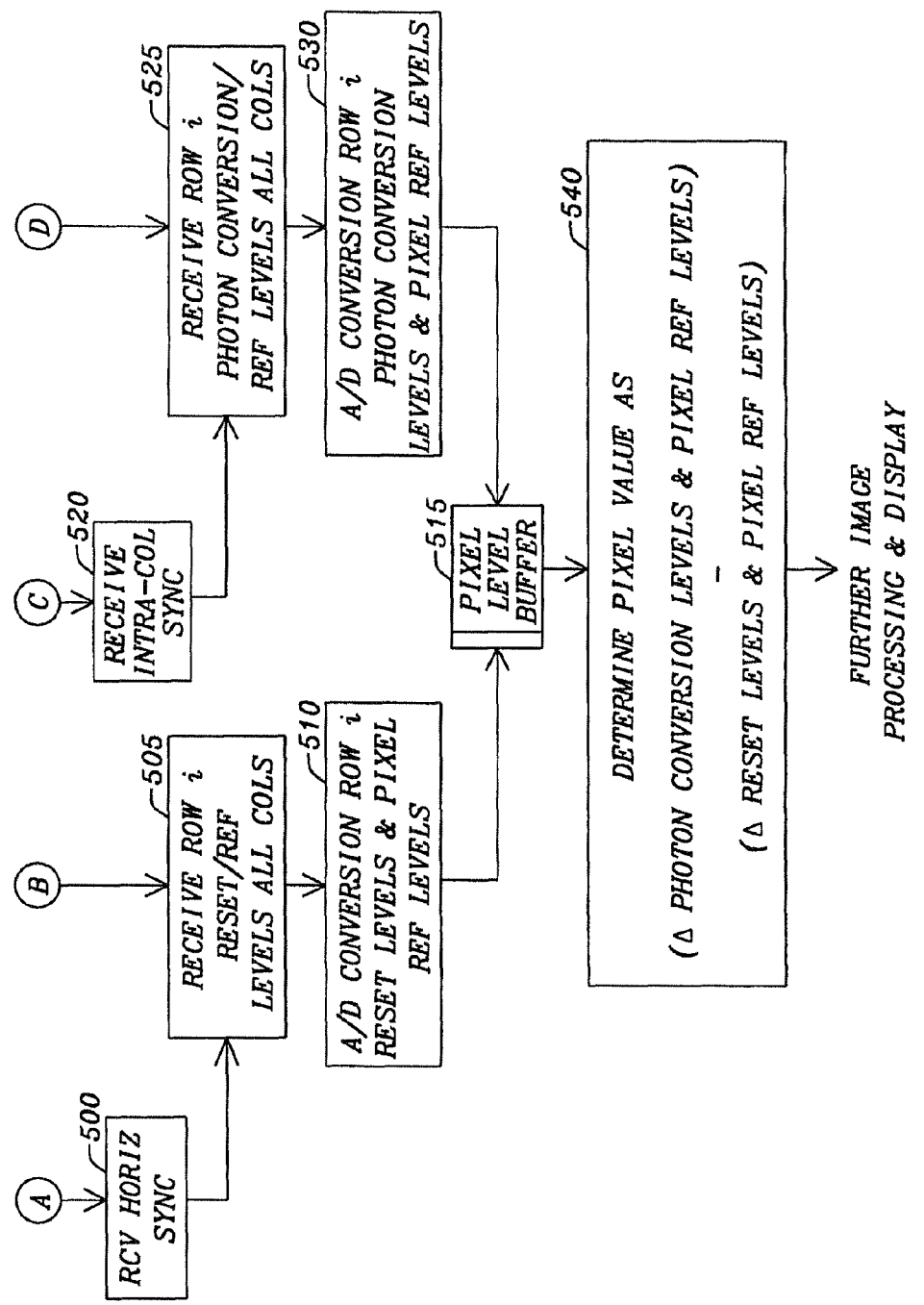

In summary, the image sensor system of this invention provides an apparatus that performs the method shown in FIGS. 7 and 8. A vertical synchronization signal is generated and transmitted (Box 400) to demarcate the beginning of each new frame of an image, as described in FIG. 6c.

A row counter is initialized (Box 405) to select (Box 410) the first row of an array of pixel image sensors as describe in FIG. 2 that arranged in rows and columns. A gated power supply voltage source is applied to the row of pixel image sensors to activate (Box 415) the selected row (i). The row reset signal is activated to reset (Box 420) to reset the photodiode and the floating diffusion capacitance storage node of each pixel of the selected row. When the reset levels are established, the row transfer gating signal is activated to transfer (Box 425) the reset voltage level to the floating diffusion capacitance storage node. A source follower senses the reset level and transfers it to the column signal bus connected to each pixel of the selected row. Simultaneously, a horizontal synchronization pulse is transmitted (Box 430) on the video output signal.

The column switches connected to all the column signal buses and to a reference voltage generator interleaves (Box 435) the reset voltage levels with a reference voltage level for transmission (Box 440) subsequent to the horizontal synchronization pulse on the video output signal.

With the row transfer gating signal deactivated at the completion of the transmission (Box 440) of the interleaved reset levels and the reference voltage levels, the pixel image sensors of the selected row (i) convert the impinging photons to photoelectrons and integrate (Box 445) them within the depletion layer of the photodiode. The transfer gate of the pixel image sensors of the selected row is activated to transfer (Box 450) the photoelectrons to the floating diffusion capacitance storage node for sensing by the source follower to generate the photo conversion signal level at the column signal buses connected to each of the pixel image sensors of the selected row. During the transfer of the photoelectrons, an intra-column synchronization signal is transmitted (Box 455) on the video output signal.

The column switches connected to all the column signal buses and to a reference voltage generator interleave (Box 460) the photo conversion voltage levels with a reference voltage level for transmission (Box 465) subsequent to the transmission (Box 455) of the intra-column synchronization pulse on the video output signal.

The row counter is tested (Box 470) if all the rows have been reset, integrated, sensed, and readout. If there are rows of the pixel image sensors to be reset, integrated, sensed, and readout, the row counter is incremented (Box 475) and the next row is selected (Box 410) to be reset, integrated, sensed, and readout as described above. If all rows are scanned, the vertical synchronization pulse is transmitted (Box 400), the row counter initialized (Box 405), and the first row is selected to be reset, integrated, sensed, and readout as described above.

The video output signal is formed of the transmission (Box 430) of the horizontal synchronization pulse, followed by the transmission (Box 440) of the reset voltage levels interleaved with the reference voltage level, then followed by the transmission (Box 455) of the intra-column synchronization signal, and the transmission (Box 465) of the photo conversion voltage levels interleaved with a reference voltage level. The intra-column synchronization signal is received (Box 520) and provides the synchronization with the horizontal synchronization pulse for the receiving (Box 525) of the photo conversion voltage levels with the reference voltage levels. The photo conversion voltage levels and the reference voltage levels are then converted (Box 530) to digital data representing the amplitudes of the photo conversion voltage levels and the reference voltage levels. The digital data representing the amplitudes of the photo conversion voltage levels and the reference voltage levels are then stored in the pixel level buffer 515. The reset voltage levels, the photo conversion voltage levels, and the reference voltage levels are retrieved from the pixel level buffer 515 and the Pixel Level Value is determined (Box 540) by the formula:

Pixel Level Value=($\Delta$ Photon Conversion Levels & Pixel Ref Levels)–($\Delta$ Reset Levels & Pixel Ref Levels)

While this invention has been particularly shown and described with reference to the preferred embodiments thereof, it will be understood by those skilled in the art that various changes in form and details may be made without departing from the spirit and scope of the invention.

The invention claimed is:

1. A system comprising:
an image sensor configured to sense light; and
a control device configured to:
prompt readout of a reset voltage from the image sensor to serially form a first sampling comprising a plurality of reset voltages associated with an array of image sensors;
prompt readout of a pixel signal voltage corresponding to the sensed light to serially form a second sampling comprising a plurality of pixel signal voltages associated with the array of image sensors;
determine a reference voltage associated with the array of image sensors; and
generate an output signal comprising both the first sampling and the second sampling interleaved with the reference voltage, wherein a pixel value associated with the image sensor is determined from the output signal based, at least in part, on a first difference between the reset voltage and the reference voltage and a second difference between the pixel signal voltage corresponding to the sensed light and the reference voltage.

2. The system of claim 1, wherein the control device is configured to prompt a reset of a stored charge in the image sensor and to prompt readout of the reset stored charge as the reset voltage.

3. The system of claim 1, wherein the image sensor is configured to convert the sensed light into a stored charge, and wherein the control device is configured to prompt readout of the stored charge as the pixel signal voltage corresponding to the sensed light.

4. The system of claim 1, further comprising an image processor configured to determine the pixel value associated with the image sensor based, at least in part, on a difference between the pixel signal voltage and the reset voltage.

5. The system of claim 1, further comprising a reference voltage generator configured to generate the reference voltage.

6. The system of claim 5, wherein the control device is configured to prompt readout of the reference voltage from the reference voltage generator.

7. The system of claim 1, further comprising an image processor configured to:
determine the first difference between the reset voltage and the reference voltage; and
determine the second difference between the pixel signal voltage and the reference voltage, wherein the pixel value corresponds to a third difference between the first difference and the second difference.

8. The system of claim 1, wherein the control device is further configured to introduce synchronization signals in the output signal in order to associate the first difference with the second difference in the output signal.

9. A method comprising:
resetting an image sensor to a reset voltage;
forming a first sampling comprising a plurality of reset voltages associated with an array of image sensors;
converting light incident on the image sensor into a stored charge corresponding to a pixel voltage;
forming a second sampling comprising a plurality of pixel voltages associated with the array of image sensors;
determining a reference voltage associated with the array of image sensors; and
generating an output signal comprising both the first sampling and the second sampling interleaved with the reference voltage, wherein a pixel value associated with the image sensor is determined from the output signal based, at least in part, on a first difference between the reset voltage and the reference voltage and a second difference between the pixel signal voltage and the reference voltage.

10. The method of claim 9, wherein the resetting of the image sensor further comprises setting a charge stored by the image sensor to the reset voltage.

11. The method of claim 9, wherein the pixel value is additionally determined based, at least in part, on a difference between the pixel voltage and the reset voltage.

12. The method of claim 9, further comprising double sampling the image sensor to readout the reset voltage and the pixel voltage.

13. The method of claim 9, further comprising generating the reference voltage with a voltage generator.

14. The method of claim 9, wherein the pixel value associated with the image sensor is determined based, at least in part, on a third difference between the first difference and the second difference.

15. The method of claim 9, further comprising inserting synchronization signals in the output signal in order to determine the first difference and the second difference in the output signal.

16. A system comprising:
an image sensor configured to sense light; and
a control device configured to:
generate a first signal corresponding to a pixel voltage associated with the light sensed by the image sensor to serially form a first sampling comprising a plurality of pixel voltage signals associated with an array of image sensors;
generate a second signal corresponding to a reset voltage of the image sensor to serially form a second sampling comprising a plurality of reset voltage signals associated with the array of image sensors;
determine a reference voltage signal associated with the array of image sensors; and
generate an output signal comprising both the first sampling and the second sampling interleaved with the reference voltage signal, wherein a pixel value associated with the image sensor is determined from the output signal based, at least in part, on a first difference between the first signal and the reference voltage signal and a second difference between the second signal and the reference voltage signal.

17. The system of claim 16, wherein the control device is configured to prompt a reset of a stored charge in the image sensor and to prompt readout of the reset stored charge as the second signal.

18. The system of claim 16, wherein the image sensor is configured to convert the sensed light into a stored charge, and wherein the control device is configured to prompt readout of the stored charge as the first signal.

19. The system of claim 16, further comprising an image processor configured to determine the pixel value corresponding to the image sensor based, at least in part, on the output signal.

20. The system of claim 19, wherein the control device is further configured to introduce synchronization signals in the output signal, and wherein the image processor is further configured to determine a difference between the first difference and the second difference based, at least in part, on the synchronization signals introduced in the output signal.

* * * * *